US007809172B2

(12) United States Patent
Lubow

(10) Patent No.: US 7,809,172 B2
(45) Date of Patent: Oct. 5, 2010

(54) METHOD AND SYSTEM FOR GENERATING AND LINKING COMPOSITE IMAGES

(75) Inventor: Allen Lubow, Brooklyn, NY (US)

(73) Assignee: International Barcode Corporation, New York, NY (US)

( * ) Notice: Subject to any disclaimer, the term of this patent is extended or adjusted under 35 U.S.C. 154(b) by 991 days.

(21) Appl. No.: 11/267,418

(22) Filed: Nov. 7, 2005

(65) Prior Publication Data

US 2007/0106561 A1 May 10, 2007

(51) Int. Cl.
*G06K 9/00* (2006.01)
*G06K 9/36* (2006.01)

(52) U.S. Cl. ........................ 382/118; 382/100; 382/284

(58) Field of Classification Search ................. 382/115, 382/118, 124, 218, 284, 100; 235/380, 382; 340/5.2, 5.24, 5.53, 5.8, 5.81, 5.82, 5.83; 345/629; 902/1–7
See application file for complete search history.

(56) References Cited

U.S. PATENT DOCUMENTS

| | | | | |
|---|---|---|---|---|
| 5,432,864 | A | 7/1995 | Lu et al. | |
| 5,572,656 | A | 11/1996 | Iida et al. | |
| 5,771,291 | A | 6/1998 | Newton et al. | |
| 5,787,186 | A | 7/1998 | Schroeder | |
| 5,841,886 | A | 11/1998 | Rhoads | |
| 5,913,542 | A | 6/1999 | Belucci et al. | |
| 5,933,527 | A * | 8/1999 | Ishikawa | 382/190 |
| 6,389,151 | B1 | 5/2002 | Carr et al. | |
| 6,556,273 | B1 | 4/2003 | Wheeler et al. | |
| 6,661,906 | B1 * | 12/2003 | Kawade et al. | 382/118 |
| 7,137,566 | B2 * | 11/2006 | Silverbrook et al. | 235/494 |
| 2002/0090123 | A1 | 7/2002 | Bazin | |
| 2003/0179903 | A1 | 9/2003 | Rhoads | |

(Continued)

FOREIGN PATENT DOCUMENTS

| | | | |
|---|---|---|---|
| EP | 0921675 | A2 | 6/1999 |
| WO | WO 01/67375 | A1 | 9/2001 |

OTHER PUBLICATIONS

International Search Report and Written Opinion mailed Jul. 14, 2008 in International Application PCT/US 06/43433.

(Continued)

*Primary Examiner*—Daniel G Mariam
(74) *Attorney, Agent, or Firm*—Davidson Berquist Jackson & Gowdey LLP

(57) ABSTRACT

A method and system for personalizing goods or services by including thereon a visible indication of the person or persons that are intended to utilize the goods and services. In one embodiment, based on computer processing, a series of parameters are calculated that can be used to generate a composite drawing (e.g., a line drawing) of the intended customer. Having created such a series of parameters, those parameters can be sent to the generator of the ticket or other personalized good. The generator can then use that series of parameters to print the composite drawing on the personalized good, either at the same time the good is originally printed or prior to providing the personalized good to the consumer. Alternatively, by receiving a customer number with the transaction confirmation from the credit card company, the merchant can download a full picture of the customer to be included on the personalized good.

30 Claims, 8 Drawing Sheets

U.S. PATENT DOCUMENTS

| | | | | |
|---|---|---|---|---|
| 2003/0211296 | A1 | 11/2003 | Jones et al. | |
| 2004/0073439 | A1 * | 4/2004 | Shuster | 705/1 |
| 2004/0107022 | A1 | 6/2004 | Gomez | |
| 2004/0162105 | A1 * | 8/2004 | Reddy et al. | 455/551 |
| 2004/0172348 | A1 * | 9/2004 | Kawamori et al. | 705/31 |
| 2004/0199280 | A1 | 10/2004 | Silverbrook et al. | |
| 2004/0207645 | A1 | 10/2004 | Cote | |
| 2004/0208388 | A1 | 10/2004 | Schramm et al. | |
| 2005/0078125 | A1 * | 4/2005 | Yamada et al. | 345/646 |

OTHER PUBLICATIONS

European Search Report mailed May 4, 2007 in European Application No. 02786862.9.

SG Appln. No. 200803512-3—Aug. 18, 2009 IPOS Office Action.

European Search Report mailed Nov. 24, 2009 in EP Appln. No. 06851910.7.

* cited by examiner

Fig. 3
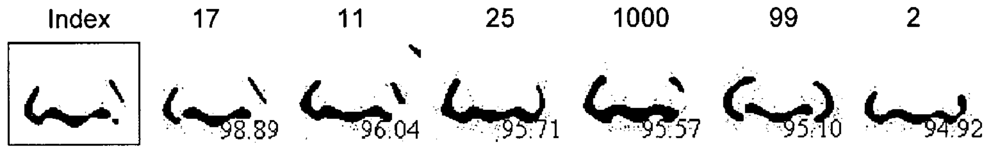
Fig. 7A
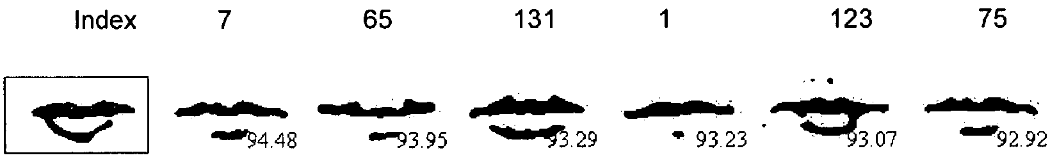
Fig. 7B

METHOD AND SYSTEM FOR GENERATING AND LINKING COMPOSITE IMAGES

BACKGROUND OF THE INVENTION

1. Field of the Invention

The present invention is directed to a method and system of providing personalization information on goods, and in one embodiment to a method and system for personalizing tickets and the like with an image of the customer who is intended to present himself/herself for use of the ticket.

2. Discussion of the Background

Numerous electronic transactions occur daily where consumers purchase goods and services in advance of when the good or service is intended to be used. For example, various travel agencies and event promoters sell tickets, in person, on-line or over the phone, prior to the ticket actually being used. Examples of such tickets include airline tickets, bus tickets, train tickets, concert/show tickets, and sporting event tickets (including tickets for the Olympics).

In addition, people have become increasingly interested in security after the attacks of 9/11. Additional screening at airports is not uncommon, and sometimes even at other locations, e.g., train stations, bus depots, and entertainment venues such as sporting events and concerts. At such screenings, security personnel often examine a person's identification (e.g., driver's license or passport) and verify that they are holding a ticket for the current day and location or event. However, tickets are not overtly connected to their intended users.

SUMMARY OF THE INVENTION

It is an object of the present invention to provide a method and system for linking visibly identifiable customer information to purchased goods prior to the utilization of those goods, thereby creating personalized goods.

In one exemplary embodiment of the present invention, a consumer purchases goods or services, and, at the time the purchase is made, the goods or services are personalized by imprinting thereon a picture of the consumer that is intended to utilize the goods or services.

In another exemplary embodiment of the present invention, when a consumer purchases goods or services, the goods or services are personalized by imprinting thereon (1) a picture of the consumer and (2) a machine-readable marking (e.g., a bar code such as an RSS bar code) that can re-generate the picture of the consumer for verification purposes.

In yet another exemplary embodiment of the present invention, when a consumer purchases goods or services, the goods or services are personalized by imprinting thereon a machine-readable marking (e.g., a bar code such as an RSS bar code) that can be used to re-generate (e.g., on a computer monitor or handheld device) the picture of the consumer for verification purposes, without the need for printing the picture of the consumer on the personalized goods.

BRIEF DESCRIPTION OF THE DRAWINGS

The following description, given with respect to the attached drawings, may be better understood with reference to the non-limiting examples of the drawings, wherein:

FIG. 3 is an exemplary bar code for providing multiple sources of information according to one embodiment of the present invention;

FIGS. 7A and 7B are illustrative comparisons between regions for a nose and mouth, respectively, of a subject being matched and various stored candidate images which are potential matches for those regions of the subject;

DISCUSSION OF THE PREFERRED EMBODIMENTS

Figure 1A:
FIG. 1A is an original picture of a consumer.
Figure 1B:
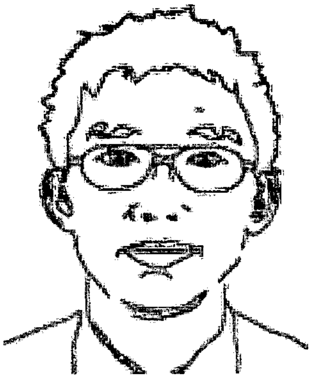
FIG. 1B is a computer generated picture of the consumer of FIG. 1A.

The present invention provides a method and system for personalizing goods or services by including thereon a visible indication of the person or persons that are intended to utilize the goods and services. For example, a picture of an exemplary consumer is illustrated in FIG. 1A. The consumer of FIG. 1A has had his picture taken. In one embodiment, the picture is taken under a pre-specified set of conditions (e.g., at a pre-specified distance, with a pre-specified lighting and at a pre-specified angle); however, variations in conditions are possible without departing from the teachings of the present invention. Based on computer processing, described in greater detail below, the present invention calculates a series of parameters that can be used to generate a composite drawing (e.g., a line drawing) such as is shown in FIG. 1B. Having created such a series of parameters, those parameters can be sent to the generator of the ticket or other personalized good. The generator can then use that series of parameters to print the composite drawing on the personalized good, either at the same time the good is originally printed or prior to providing the personalized good to the consumer.

In an alternate embodiment, rather than printing the composite drawing itself, the personalized good is imprinted with a bar code that contains sufficient information for a verifier to generate or obtain the composite drawing such that the verifier can view the generated or obtained composite drawing (e.g., on a display monitor) and have greater confidence that the person utilizing the personalized good is really the intended user. After viewing the generated or obtained composite drawing (e.g., on a display monitor), the verifier may allow the bearer of the personalized good the permissions associated with the good, e.g., entrance into a building, event or vehicle.

Similarly, rather than imprinting the information, the personalized good can be encoded with the information using an alternate information carrier, e.g., an RFID chip.

In a further embodiment, the personalized good is imprinted with (or encoded with) both the composite drawing and the bar code that contains sufficient information for a verifier to generate or obtain the composite drawing.

Figure 2:
FIG. 2 is an exemplary ticket that has been personalized by supplementing conventional ticket information with a line drawing of a consumer that is intended to use the ticket.

FIG. 2 is an exemplary ticket that has been personalized by supplementing conventional ticket information with a line drawing of a consumer that is intended to use the ticket. The series of parameters according to the present invention is preferably small enough that they can be sent easily between (a) a credit card company and (b) the generator of the personalized good. For example, when an airline charges a ticket to a consumer for a flight, there are a small number of bytes (e.g., about 25 bytes) that the credit card company can send to the airline as part of the confirmation of the transaction. According to the present invention, the credit card company can include in those small number of bytes the series of parameters needed to recreate the composite drawing. Then, the airline will have the information necessary to print the ticket with the visible personalized information, as shown in FIG. 2. (The series of parameters is preferably less than 50 characters/bytes and more preferably approximately or less than 30 characters/bytes.)

In an alternate embodiment of the present invention, the personalized good may be supplemented with an additional source of information (e.g., a bar code (such as a RSS bar code), a magnetic strip, an RFID chip and a watermark). This additional source of information preferably encodes the series of parameters so that the visible personalization can be verified in real-time. (As used herein, "information carrier" shall be understood to include any machine readable mechanism for providing information to a machine that can be imprinted on or embedded into a personalized good, including, but not limited to, bar codes, magnetic strips, RFID chips and watermarks.)

In an alternate embodiment of the present invention, the series of parameters may not be sent directly to the generator directly but may instead be sent indirectly. For example, the credit card company may send (over a first communications channel, e.g., via modem over telephone) a customer-specific identifier (e.g., a 5-byte identifier) with the transaction (especially if it is shorter than the series of parameters), and the generator of the personalized good can then download (potentially over a second communications channel, e.g., via a network adapter across the world wide web), from a known location, the series of parameters using the customer-specific identifier as an index. With the downloaded series of parameters, the generator can then add the line drawing to the personalized goods, as described above.

In one exemplary embodiment, both the customer-specific identifier and the series of parameters for generating the composite image are included on the same personalized good in two different formats. For example, as shown in FIG. 3, the first format is the linear format of an RSS bar code which is used to encode a very small number of bytes. Thus, the linear format would be well suited to encoding the customer-specific identifier. The series of parameters, however, could be encoded with a second format, e.g., the composite portion of the RSS bar code. Alternatively, the composite portion could be encoded with, in addition to or in place of the series of parameters, other identifying information (e.g., name, address, age, height, weight, gender, and age).

The customer-specific identifier can be either time-independent (i.e., is always the same for the customer) or time-dependent (i.e., changes over time) such that the same series of parameters may be referenced by different customer-specific identifiers at different times. In such a time-dependent implementation, the generator could print the personalized information with a series of parameters that is specific to the day that the personalized good is intended to be used. (A personalized good may even be encoded with multiple series of parameters, each of which is intended to generate the same image, but on a different day, for use in a multi-day activity, e.g., a multi-day sporting event such as with an Olympics ticket or ski lift or a multi-day amusement park ticket).

Additionally, the time-dependent identifier can be utilized when the permission to perform an activity may change from one person to another during a particular interval. For example, when a child is checked in and out of daycare, the child's bar code may be scanned. However, since the mother drops off the child and the father picks up the child, the time-dependent identifier would cause the mother's picture to be recalled by the computer in response to the child's bar code being read in the morning and it would cause the father's picture to be recalled in response to the bar code being read in the evening.

In the case of a bank customer (e.g., an elderly person) having given a power of attorney to someone, the holder of the power of attorney may be identified by a time-dependent identifier such that if the holder of the power of attorney were changed, the bank would see the picture of the new holder of the power of attorney when a document (e.g., a check) was scanned and know that the old holder was no longer the correct representative of the bank customer.

In yet another embodiment, a ticket for passenger may be encoded with the permission to have an escort (e.g., for a minor traveling by himself/herself) and optionally the photo of the escort, in addition to or in place of the photo of the minor. The escort may also have an "escort pass" that is a duplicate of the ticket of the minor but with a notice stating "ESCORT" thereon and which is not valid for travel.

Moreover, time-dependent customer-specific entries may expire such that they cannot be retrieved after a certain period of time. Likewise, the customer-specific identifiers may be encrypted for additional protection such that the generator must decrypt the identifier before using it.

The time-dependent information may also be utilized for other reasons. For example, it is possible to send the person's image wrapped in different clothing (with uniform or without) or, send the person's image without glasses or facial hair (software generated), or aged differently (ten years later aged by computer) or with other images (parents of a small child or relatives of an elderly person).

In a further embodiment, in response to sending the customer-specific identifier rather than the series of parameters, the generator may request and receive, in addition to or instead of the series of parameters, a more detailed picture of the customer than is utilized in FIG. 1B. In such a case, upon receiving the customer-specific identifier "123456789", the generator may request that the information server (e.g., web site) for the credit card company send a specified type of picture. For example, the generator would send to the credit card company a request ("123456789", "composite") if the generator wanted or could only use a composite image (e.g., the line drawing as shown in FIG. 1B). However, the generator would send to the credit card company a request ("123456789", "high-res") if it wanted or could use a high resolution picture like FIG. 1A. (As will be explained in greater detail below, because no name is sent with the request, the credit card company assumes that it should send the default picture associated with the credit card being used.) Alternate image qualities can likewise be specified (e.g., "low-res," "medium-res" and "thumbnail").

Alternatively, the generator may receive a picture of a specified type and the series of parameters such that the picture and the information necessary to regenerate the composite image can both be printed or encoded onto the personalized goods (e.g., by storing the series of parameters in a bar code on the personalized good). Thus, the person verifying the personalized good could both look at the printed picture and scan the personalized good as part of the verification. The person verifying would use either a computer with a database of the series of parameters such that he/she could verify that the printed picture and picture generated from the database were the same, or he/she could utilize a handheld scanner with a display that has the same functionality. When this embodiment is used in conjunction with a time-dependent series of parameters, then copying the bar code from an earlier or later date would not be helpful to a forger since the forger would not know how the series of parameters were mapped to the values of the bar code for the day for which the forger does not actually have a personalized good. In such a case, the generator would only need to send out to the scanners the mapping of parameters to their particular elements on the day that the personalized goods were validated. Alternatively, the changing of the parameter mapping could follow a specified function (e.g., a hash function) utilizing the day or time that the personalized good was valid on as at least part of an index of the specified function. The function may also be based on a type of personalized good such that a concert ticket bought for the same day as a train ticket for the same person need not, and preferably would not, produce the same set of parameters. Thus, the scanners could be made less reliant on receiving updates from the generator.

In the event that the personalized good is being purchased for a customer other than the credit card holder, than the generator would receive an identifier as part of the transaction which can be used in conjunction with the level of detail required and the name of the intended consumer. For example, upon receiving the identifier "123456789" as part of the credit card transaction, the generator would send the request ("123456789", "composite", "John Doe") or ("123456789", "composite", "Jane Doe"), depending on whether the ticket agency was issuing a ticket for Mr. or Mrs. Doe. (If Mr. Doe was the named person on the credit card, his request could have just been shortened to ("123456789", "composite").

As discussed above, minors sometimes travel alone as "unaccompanied minors." However, an escort may want to accompany the minor to the plane. Thus, the generator may, for a single ticket, make two requests, one for the minor ("123456789", "composite", "Jimmy Doe", "minor") and one for the escort ("123456789", "composite", "John Doe"). For the first received image, the generator may include a first specialized label, e.g., "Unaccompanied Minor" on the ticket and, for the second received image, the generator may include a second specialized label (e.g., "Escort") on the escort pass.

According to the present invention, a computer system will contain at least one picture that can be either (1) sent directly between (a) an information clearinghouse (e.g., a credit card company (or consumer)) and (b) an information requester (e.g., a generator of the goods) or (2) sent indirectly by sending an identifier to the information requester which the requester (e.g., generator of the goods) utilizes to request the at least one picture. In an exemplary embodiment of the present invention, a credit card company acts as an information clearinghouse and records pictures associated with each of its credit cards. For example, where a family has two adults, each with their own credit card with a separate number, and two children, a credit card company may associate four pictures with each of the two cards. (The picture of the named holder of the card would be the default picture corresponding to the card number where their name appears.)

Many other organizations can act as an information clearinghouse. For example, the host of a meeting can act as a clearinghouse of the pictures and information of the attendees of a meeting. Similarly, a daycare center would act as a clearinghouse for information on children and the parents or guardians that are supposed to pick-up and drop off the children. Moreover, while the above has been discussed in terms of a credit card company acting as a clearinghouse for multiple other travel companies, it is also possible for a travel company to act as its own clearinghouse. For example, the personalized tickets may be encoded with a customer identifier or a series of parameters that are internal to the company. It is possible for the company (e.g., airline, train, bus, hotel) to obtain an image of the customer, e.g., when the customer enrolled in the frequent traveler program. The company could then print its own personalized goods (e.g., tickets) with the customer's image thereon, or with the customer's frequent traveler number thereon (in machine-readable form) or with the series of parameters encoded thereon (in machine-readable form). In the case of an airline, at the gate, the gate attendant could then perform the same verification described above and determine from an image on the ticket or an image on a display that the passenger appears to be the intended person.

In the above-described embodiment where only a non-composite picture (e.g., a captured image of the customer) can be requested, the information clearinghouse (e.g., credit card company) would have sufficient information to then begin sending personalization information to generators immediately after associating the pictures with account numbers (and optionally with the names on the account(s) if there is more than one person per account number). The information clearinghouse could then, in response to requests (e.g., charge requests), immediately begin sending identifiers to ticket generators (e.g., merchants) that would enable the ticket generators to request (1) the non-composite picture and optionally (2) the identifier that a scanner (or person) can read for verification on the day that the personalized good is to be used.

In addition to situations where the goods or services are to be utilized in the future, it is also possible to utilize the teachings of the present invention to print an image directly on the receipt that a customer is about to sign (or prior to authorization). For example, as an added measure of security, the credit card company can send the unique identifier or the series of parameters to a merchant so that the customer's picture can be verified by the merchant. In one such case, when a merchant prints out a receipt, the image of the customer is printed out either on the receipt or on another document such that the merchant can see if this really is the customer. In this way, the merchant can see if the person who is purporting to be "Mr. John Doe" looks anything like the image received from the credit card company (or using the series of parameters received from the credit card company). Similarly, in the case of an electronic cash register (e.g., a register with a touch screen) with a screen or monitor, the face of the intended customer could be displayed on the screen of the register.

In order to address privacy concerns, a customer may need to "turn on" this functionality, either globally or on a merchant-by-merchant basis. The credit card company, however, may provide incentives (e.g., lower annual fees or interest rates) for the customer to turn on this additional verification measure in order to reduce fraud. Alternatively, the credit card merchant may send a string of characters (e.g., an encrypted string) which is only usable by another entity who as been given permission by the customer by virtue of the fact that the customer agrees to have this system implemented and the recipient of the information agrees to handle the information discreetly.

There also exist many scenarios under which a composite image and/or the series of parameters that generate the composite image are preferable. One such embodiment is where the verifier does not have access to a high bandwidth connection for verifying a high resolution picture. In such an embodiment, the verifier may wish to use a low-memory (or small database) device that is capable of autonomously regenerating a composite version of a likeness of the intended customer. To do so, the present invention utilizes facial characteristic matching (described in greater detail below), as opposed to facial recognition where the person's face is actually identified as belonging to a particular person.

According to a facial characteristic matching system, a person's picture is taken, preferably under conditions similar to an idealized set of conditions, e.g., under specific lighting at a specific focal distance, at a specific angle, etc., or at least under conditions which enable accurate matching. Having used those conditions, the face in the picture is then received by a processor (using an information receiver such as (1) a communications adapter as described herein or (2) a computer storage interface e.g., for interfacing to a volatile or non-volatile storage medium such as a digital camera memory card) and broken down into several sub-components (or regions) so that various portions of the face can be matched with various candidate likenesses (e.g., stored in an image repository such as a database or file server) for that sub-component or region. Candidate likenesses can be stored in any image format (e.g., JPEG, GIF, TIFF, bitmap, PNG, etc.), and the sizes of the images may vary based on the region to be encoded.

Figure 4A:
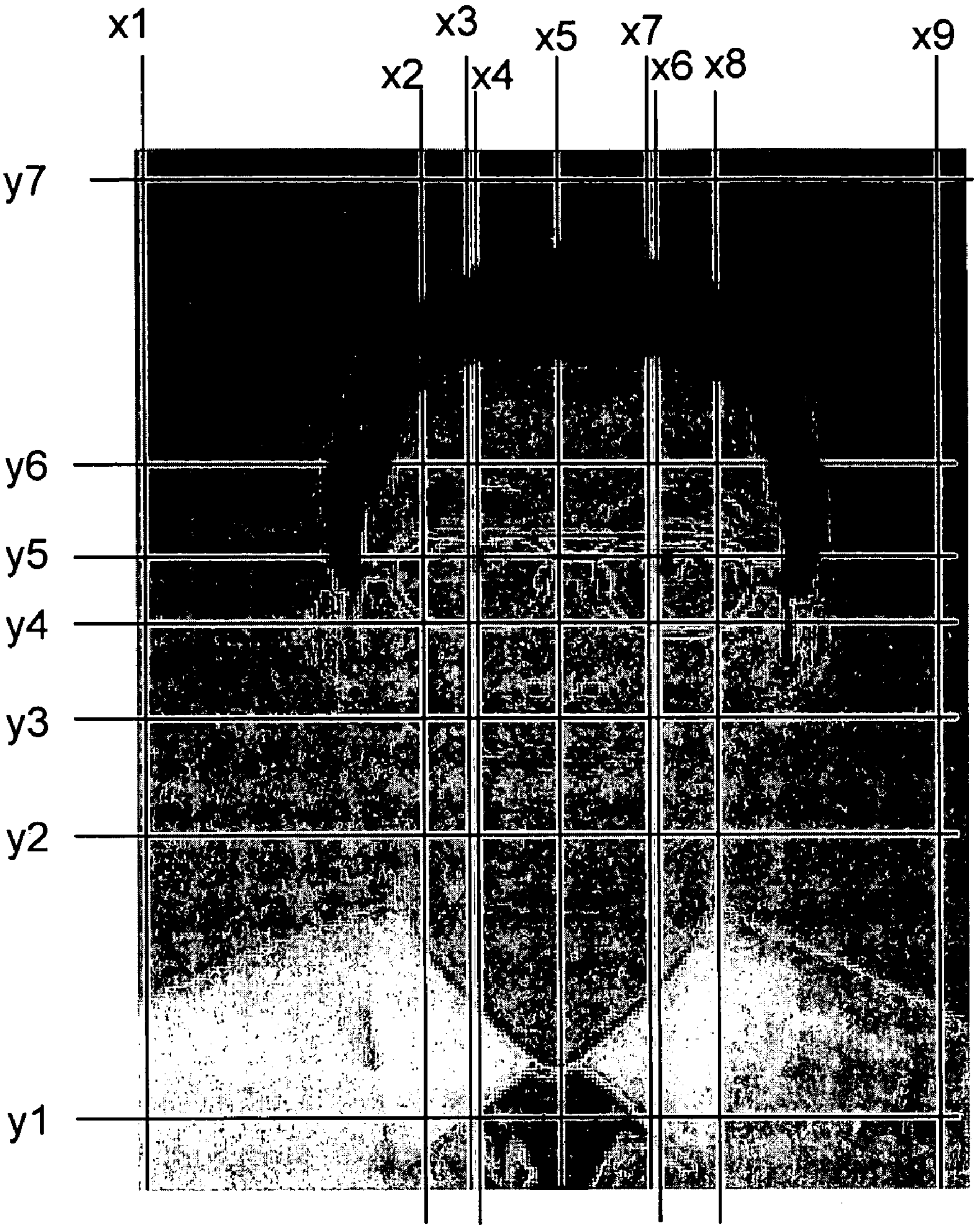
FIG. 4A is a diagram of an exemplary division of a photograph in order to produce a computer generated picture according to the present invention.

For example, the photograph of FIG. 1A has been divided at several vertical and horizontal lines in FIG. 4A. With respect to FIG. 4A, the description of the illustrated divisions is made from the person's perspective, so the reader is reminded that the person's right eye is on the left-side of the page. The terms "inner edge" and "outer edge" are meant to refer to the edge's closer to the center of the image and further away from the center of the image, respectively. The illustrated divisions include:

TABLE 1

| Vertical lines marked $x_i$ | | Horizontal lines marked $y_i$ | |
|---|---|---|---|
| $x_1$ | Left edge of image | $y_1$ | Bottom edge of image |
| $x_2$ | Outer edge of right-eye region | $y_2$ | Bottom of mouth rectangle |
| $x_3$ | Outer edge of mouth rectangle on person's right | $y_3$ | Centerline between bottom of nose and top of mouth |
| $x_4$ | Centerline of right eye | $y_4$ | Bottom of eye rectangles |
| $x_5$ | Centerline of face | $y_5$ | Centerline of eyes |
| $x_6$ | Centerline of left eye | $y_6$ | Top of eye rectangles |
| $x_7$ | Outer edge of mouth rectangle on person's left | $y_7$ | Top of image |
| $x_8$ | Outer edge of left eye region | | |
| $x_9$ | Right edge of image | | |

Figure 5:
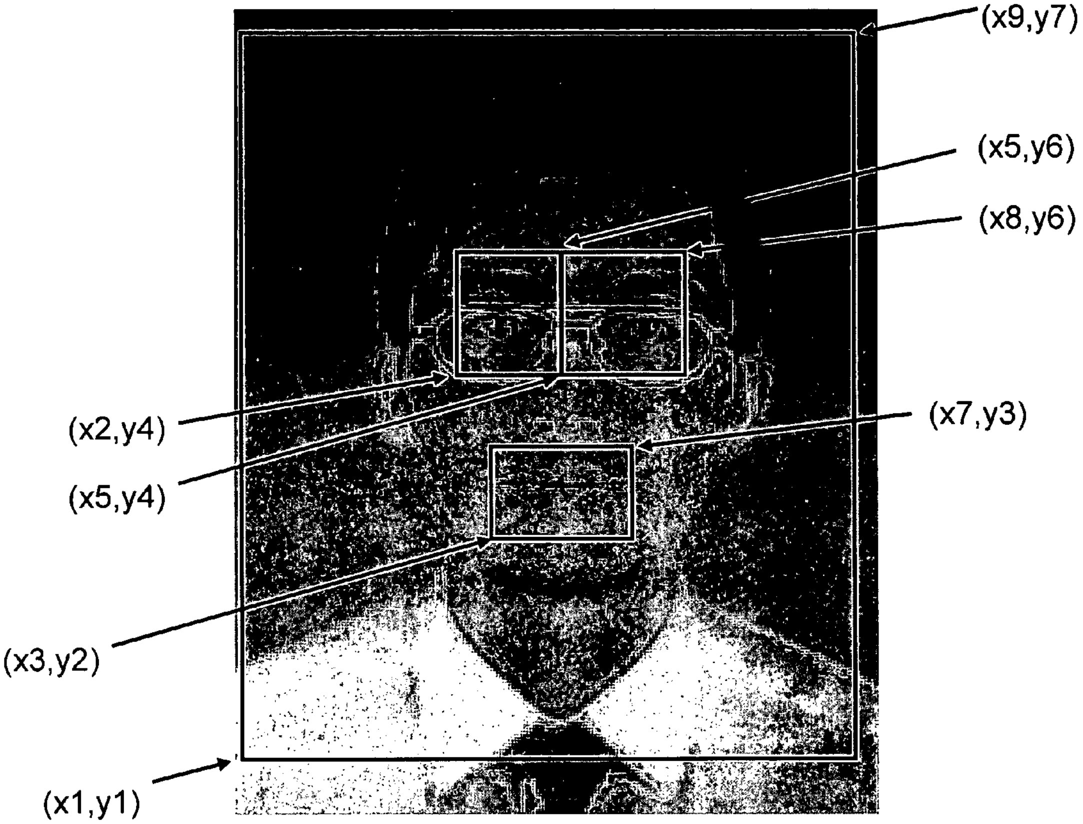
FIG. 5 is a diagram of several areas of interest using the divisions of the photograph of FIG. 4A.
Figure 6:
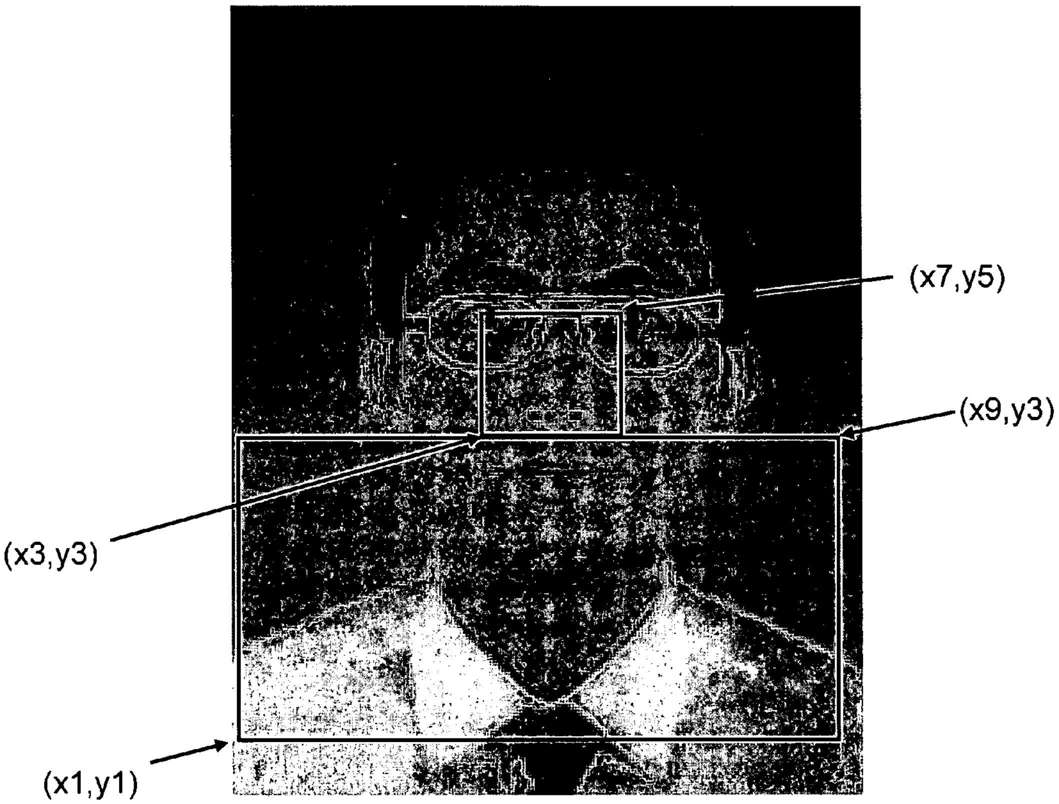
FIG. 6 is a diagram of an additional area of interest using the divisions of the photograph of FIG. 4A.

Using the notation of the divisions as set forth in Table 1, an exemplary embodiment of the present invention divides the face four regions as shown in FIG. 5 and an additional two regions as shown in FIG. 6. In FIG. 4A, the image as a whole can be cropped as necessary so that the image is limited to a rectangle defined by a lower left corner and an upper-right corner specified by (x1,y1) and (x9,y7) respectively. The right eye is then defined by (x2, y4) and (x5, y6) while the left eye is then defined by (x5, y4) and (x8, y6). Similarly, the mouth region is then defined by (x3,y2) and (x7,y3). As shown in FIG. 5, an exemplary embodiment also defines a nose region by (x3,y3) and (x7,y5) and a neck region by (x1,y1) and (x9,y3), respectively. Although not shown separately, the present invention may also include a hair region that is treated as the other illustrated regions. Glasses may also be treated separately to reduce the complexity of the analysis. However, since various applications may have varying requirements for which matches are "good enough," one of ordinary skill in the art will appreciate that the rules for defining "good enough" may vary without departing from the teachings of the present invention.

Figure 4B:
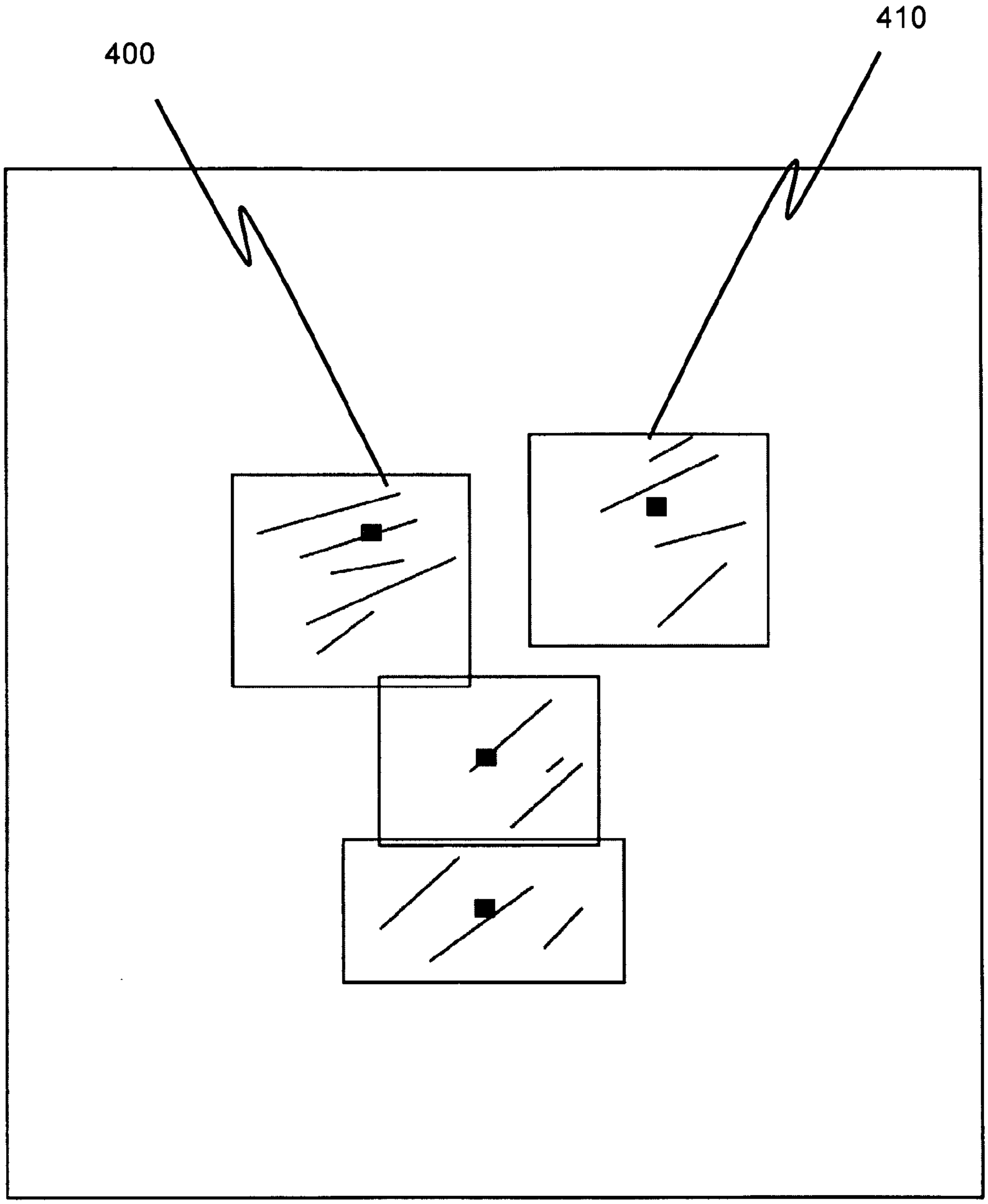
FIG. 4B is a diagram showing an alternate division of a photograph.

In an alternate embodiment of the present invention shown in FIG. 4B, rather than using the regions discussed above, four points (e.g., (1) the center of left eye, (2) the center of right eye, (3) the tip of nose and (4) the top edge of the upper lip) are selected. The image can then be broken down into several (e.g., six) rectangular regions based on the locations of those four points, with an additional two elements (i.e., glasses and facial hair) being specified separately. The sizes of the regions are preferably fixed based on the region being encoded. For example, based on the location of the point at the center of the right eye, the right eye region 400 may be selected to be a rectangle (e.g., 78×86) with the right eye either (1) off-center (at location 48, 26) within the box or (2) centered within the box. Similarly, the left eye region 410 may be selected to be a different sized rectangle (e.g., 78×88) with the left eye either (1) off-center (at location 38, 30) within the box or (2) centered within the box. Additional regions other than the illustrated regions may also be used (e.g., a top of the head region and a jaw region) based on the locations of the selected points.

A computer or other image analyzer selects each of the possible regions (e.g., the regions defined in (a) FIG. 4B or (b) FIGS. 5 and 6 as a subject region and then compares the subject region with its corresponding region in a database of identifiable regions, potentially after at least one pre-processing step. For example, as shown in FIG. 7A, a subject nose region is pre-processed to accentuate just the major edge regions (shown in the box on the left). Then, a database that has been created using the same or similar pre-processing is read to obtain potential matching regions. The database preferably contains a sufficient number of different shaped noses such that a human verifier and a computer can isolate differences between the different shapes. However, the number of entries in the database should not be so large as to make it difficult to create portable systems. Thus, the number of entries in the database, or even for any particular feature in the database, should not be too large.

As shown in FIG. 7A, the first database nose (index 17) selected has a matching score of 98.89 which indicates that the 98.89% of the subject image matched that of the first selected nose. That is, 98.89% of the black pixels in the subject region corresponded to black pixels in the corresponding image selected from the database. Alternatively, in the second database image from the left (index 11), only 96.04% of the pixels corresponded to the subject nose image. Alternatively, the present invention can instead match the number or percentage of white pixels in the subject region that match a selected image in the database. Similarly, the present invention can utilize the number of pixels where white pixels matched white pixels and black pixels matched black pixels. Color-based matching may also be utilized. In the pre-processing steps, the color images may be smoothed to reduce color variations and may even be filtered to reduce the total number of colors being compared down to a small number (e.g., less than 10). However, full-color matching can be used in the most sophisticated implementation. The present invention may also utilize comparisons based on groups of pixels together rather than individual pixels, such as may be used in a neural network comparator.

The present invention may also utilize heuristics to speed processing. For example, if more than a certain percentage of pixels are matching, then the system may determine that the selected image is "close enough" and utilize the index of that selected image, even though other images in the database have not yet been checked and could be closer.

Each of the images selected from the database likewise corresponds to a unique index such that each image can be selected by querying the database for the image with that index when specifying its corresponding region. The indices corresponding to the illustrated noses of FIG. 7A are, from left-to-right, 17, 11, 25, 1000, 99 and 2. Thus, once the closest match to the subject image has been determined, then that portion of the image is "compressed" to its corresponding index in the database (e.g. 17 in the database table "Noses" or image 17 which is implicitly in the "noses" directory) such that the entire nose region is encoded in a very small number of bits. In one embodiment, there are a maximum of 65,536 possible noses which are encoded in two bytes. However, if a smaller database provides sufficient matching, it may be possible to utilize fewer bits per region (e.g., 10 bits for the nose if there are less than 1024 nose images).

Also, once a robust database is established, there may be little need to supplement it, even when more people's images are entered into the system. In other words, the database may contain a sufficient number of examples to find close matches for new images without having to expand the database. This means that the distributed 'decoding' lookup tables do not need to be updated often. This is a significant advantage over systems that might have full representations of the original images by completely replicating the entire database for lookup at a remote location.

Similarly, when the mouth region of a photo is selected, the mouth image may be (1) pre-processed similarly to the nose region, (2) pre-processed with a technique other than that used on the nose region or (3) not pre-processed at all. After any pre-processing that is to be done, the subject mouth region is compared to all the mouth regions in the database to again find a closest match. In the example of FIG. 7B, the subject mouth region is shown near mouth images having indices 7, 65, 131, 1, 123, and 75. Mouth image 7 is the most closely matching image with a 94.48% match. As would be apparent to one of ordinary skill, the mouth image could be compared against many more images than are shown. Thus, the subject mouth region would be "compressed" down to the index 7 (represented in e.g., 2 bytes).

After the process is repeated for all or most of the entries in the database for each of the selected regions, then the face can be reconstructed using just the indices for the image. In the illustrated embodiment of FIGS. 5 and 6, the original image would be converted to 5 indices, one for each of: the left eye, the right eye, the nose, the mouth and the neck region. Once each of the regions has been converted to its corresponding index, they are concatenated in an order specified by the information clearinghouse to establish the series of parameters that represent the image of person. For example, assuming that the nose index is 17 and the mouth index is 7, and assuming that the nose and mouth are encoded using 16-bits and 8-bits, respectively, then the series of parameters would include the 3 bytes xxxx001107yyyy, where the nose and mouth indices have been converted to hexadecimal notation and where they are preceded and followed by other fields (represented as xxxx and yyyy) which may be either other indices or where an image of a particular index is to be placed. An exemplary encoding is given by:

| Field Number | Field Meaning | Number of Bytes to Represent Field |
|---|---|---|
| 1 | Nose/mouth x-coordinate | 2 |
| 2 | Nose/mouth y-coordinate | 2 |
| 3 | Right eye x-coordinate | 2 |
| 4 | Right eye y-coordinate | 2 |
| 5 | Left eye x-coordinate | 2 |
| 6 | Left eye y-coordinate | 2 |
| 7 | Right eye index | 2 |
| 8 | Left eye index | 2 |
| 9 | Nose index | 2 |
| 10 | Mouth index | 2 |
| 11 | Top | 2 |
| 12 | Bottom | 2 |

The series of parameters may then be converted to an alphanumeric string "%4X6F834GGC939$#4K21" suitable for encoding on a bar code (e.g., an RSS bar code). That alphanumeric string is then stored in a database in a record corresponding to the customer.

When an information clearinghouse is requested to provide a series of parameters corresponding to a person in its database, it may retrieve the record corresponding to the person and send, using a communications adapter such as a modem or network adapter (such as an 10/100/1000 Ethernet adapter, a 802.11 network adapter or a Bluetooth adapter)), the series of parameters to the information requester. In alternate an embodiment (e.g., where the information clearinghouse and the generator are one and the same), the communications adapter includes a connection (e.g., a direct connection) to the printer or "embedder" of the information. The series of parameters may be in either unencrypted or encrypted for (e.g., having been encrypted using symmetric or asymmetric encryption, where exemplary asymmetric encryption includes public key-based encryption).

The generator of the personalized goods then receives, with an information receiver (e.g., a communications adapter such as a modem or network adapter (such as an 10/100/1000 Ethernet adapter, a 802.11 network adapter or a Bluetooth adapter)), the received information.

Figure 9:
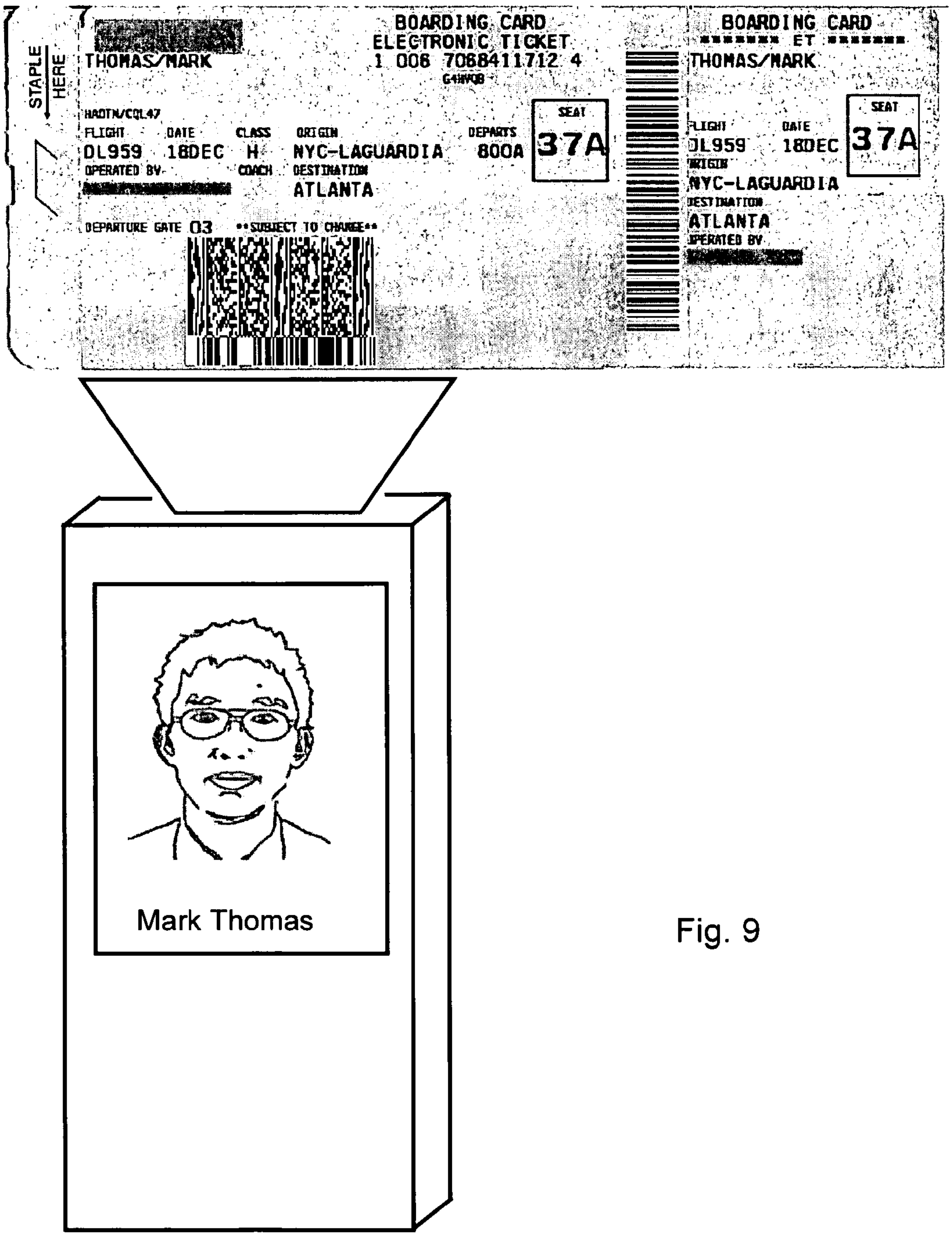
FIG. 9 illustrates a handheld scanner capable of reading a bar code and displaying an image generated from the read bar code.

In the case where the requester generates a printed personalized good (e.g., a ticket), the information requester may convert the received alphanumeric string (e.g., "%4X6F834GGC939$#4K21") into a bar code (e.g., such as is shown in FIG. 2, FIG. 3 or FIG. 9) or other machine readable marking (e.g., a watermark). In the case where the requester embeds, using an "embedder" (e.g., an RFID writer or magnetic strip writer), the information into the personalized good (e.g., embedded into an RFID), the alphanumeric string need not be converted to a bar code.

Once the personalized good has been imprinted with or embedded with at least the alphanumeric string, the good is provided to the intended customer. For example, the ticket may be shipped to the customer.

It should be noted that the personalized good need not be provided to the customer at the time the transaction is completed. For example, in an embodiment where the personalized good is an electronic ticket, the good is "held" electronically until the customer checks in (e.g., at a kiosk using his/her credit card). At the time of check in, the good is then imprinted and provided to the customer.

When the customer attempts to utilize the personalized good, a machine reader (e.g., such as a bar code scanner, magnetic strip reader, watermark reader or an RFID reader) acting as an information carrier reader reads the information imprinted on or embedded in the personalized good. In the case of the example above, the reader reads back the alphanumeric string (e.g., "%4X6F834GGC939$#4K21") in either unencrypted or encrypted form. In the case of information representing the series of parameters, the reader then decodes the information into its various parts representing the various regions. For example, the reader converts "%4X6F834GGC939$#4K21" into "xxxx001107yyyy" and then reads out the indices for the various regions (including 0011 (hex)=17 (decimal) for the nose and 07 (decimal) for the mouth).

Having determined the indices from the read information, the reader retrieves the images corresponding to the determined indices. These images may be read from a database having image region specific tables (e.g., a nose table, a mouth table, a hair table, etc.) or may be read from a persistent storage device or file server using a known naming convention based on the indices (e.g., "\noses\0017" using a decimal notation or "\noses\0011" using a hexadecimal notation). The reader then reconstructs an image having the likeness of the intended customer by placing each corresponding image in its corresponding location (either defined automatically or as part of the read information).

In the case where the read information includes more than just the series of parameters, the display also provides the verifying personnel with the additional information (e.g., height, age, race, etc.). The reader can then display the image (and additional information) to the verifying personnel (e.g., ticketing agent or security guard) such that the verifying personnel have an increased confidence that the bearer of the personalized good is the intended user thereof.

In the case where the information read by the reader does not contain the series of parameters but only a customer specific identifier, then the reader requests from the information provider a copy of the visual information to be used to verify customers. For example, the reader sends the read information to the information provider and requests the desired level of detail in the picture to be returned. A likeness is returned or the parameters required to generate a likeness are returned and received by an information receiver, and the likeness of the person is then displayed to the verifying personnel for comparison with the person attempting to utilize the personalized good.

While comparing a subject region to entries in the database, it is also possible to utilize small variations on the images in the database (or in the subject image) by altering the location in the image or the rotation of the image. For example, since an image may only be off a few pixels to the left, the present invention may "wiggle" either the subject image or the image in the database a little to the left (and similarly a little to the right or up or down) and repeat the check of how well the images match. (As is described below, the images do not have to be "wiggled" very far since the variations of 15% or more appear to cause visible differences during facial recognition in people.) Similarly, a system according to the present invention may rotate the image slightly clockwise or counter clockwise, and rerun the comparison. In this way, small variations to the eye (which may seem like larger variations to the computer) have a reduced effect. Alternatively, the present invention may utilize shape-based searching such that the shape of a region may be used for matching rather than individual pixels. For example, the present invention may search for a particular shaped-triangular in the upper-lip region when searching for a match. Similarly, the shape of other regions, such as the shape of the head, can be utilized as additional regions to be matched.

In addition the shapes of the regions, the present invention may encode the center of the location of the regions as well. For example, while two people may both have the left and right eyes of indices 11 and 57, respectively, those two people may look very differently if the space between the eyes is very different. Thus, the location (or at least distance between the eyes) is an additional parameter that may need to be encoded in the series of parameters. Empirically, it appears that the same facial part, identical on two separate faces, is recognized as being the same when within 10-15% of the same position, but at greater variances movement the face seems to be no longer considered a likeness. In other words, two identical faces but with one having eyes that are 10% wider apart than the other nonetheless appear to be the same face. If the eyes were 15% wider apart, then they appear to be the faces are of two separate people. Likewise, if a facial part (e.g., a nose or eye) were bigger or smaller by 10%, the faces would still seem to be the same. However, when the size variation is 15% bigger or smaller, then the faces appear different. Thus, with a sufficient number of parameters being examined and encoded, the series of parameters can be treated as a "fingerprint" that uniquely identifies the person.

Moreover, the series of parameters may be supplemented with other parameters other that the indices of the regions such that additional physical information is provided. For example, using only a few bits, the color of the eye can be included along with the index for the eye shape if there are a statistically significant number of different colors for that shape of eye. The color of the eye may either be represented with color using a color printer, with shading/hatching or with text. Similarly, the height of the customer (e.g., in inches) might be represented textually or graphically and can also be sent in a very small number of bits.

The above discussion of division of the face into various parts can be performed either by computer analysis, manually, or by a combination of both. For example, it may be more effective to have a person identify certain locations, such as the x-centerline of the face and the midpoint between the nose and mouth. However, some locations like the center points of eyes may be more amenable to computer identification. Likewise, the identification of the location of the lips may be performed or aided programmatically by examining color variations in the mouth region. It is very common that the region between the nose and lips varies noticeably from the lip region itself.

In addition, while the above discussion has been given with respect to certain segregations of the facial image, other facial segregations may be possible. For example, it may be sufficient to allow the computer to select a fixed distance from the eyes rather than try to find the x-centerline of the face. It may also be possible to reduce the complexity of the calculation by adding additional constraints (e.g., no glasses). Alternatively, the image created by the present invention may optionally have glasses superimposed over the rest of the facial image if desired. However, since the procedure is contemplated to be performed rarely, some level of manual intervention may be deemed acceptable in order to properly divide the face.

Figure 8A:
FIGS. 8A to 8C illustrate a progression of an original image to a pre-processed image that can be utilized as a subject image.
Figure 8B:
Figure 8C:

As discussed above, some amount of preprocessing may be utilized to reduce the complexity of the comparison between the subject images and the images in the database. As shown in FIGS. 8A to 8C, it is possible to start with an original image (FIG. 8A) and apply a filter to accentuate the transition regions. The image of FIG. 8B was created using a "Sketch: Stamp" filter as is available in the Adobe PHOTOSHOP family of products. Similarly, the image of FIG. 8C was created using the same filter, but the image of FIG. 8A was enlarged 200% before filtering and then reduced by 50% after filtering to reduce the edge widths of some of the transition regions. As discussed above, the same preprocessing need not be applied to each region. For example, for noses it may be preferable to utilize the filtering of FIG. 8C and for mouths the filtering of 8B. Thus, the nose and mouth regions would be captured at different times and analyzed against similarly processed regions.

Because the amount of data needed to generate a composite image is so small, the present invention can be utilized in many applications where the transmission of a full image (e.g., a bitmap or a JPEG image) may be prohibitive. Examples of such environments where a composite image may be beneficial include encoding a picture in a bar code such as on a ticket. Other examples include: (1) the recording of an invoice or purchase order or sales receipt in a small shop where the computer size and capacity is limited; (2) a credit card transaction which involves the transmission of as little as 79 characters of information; (3) the information on a building pass which is held in an RFID chip which might be limited to 1000 characters of information; (4) a bar code on a wristband which might be limited to 80 characters; and (5) the bar code on a prescription bottle which might be 45 characters.

It is also possible to utilize the teachings of the present invention to provide identification cards, such as might be used by attendees at a conference, athletes at a sporting event (such as the Olympics), and even driver's licenses and the like. In embodiments such as those, it may be preferable to include both a non-composite picture and at least one bar code for verifying the information on the identification card. The information to be verified may be (1) the text of the identification card (e.g., name, identification card number, validity dates, etc.), (2) the photo on the identification, or (3) both (1) and (2). Moreover, the different portions of the information to be verified may be stored in either the same bar code or in different bar codes. When multiple bar codes are utilized, the bar codes may be placed adjacent each other or remotely from each other, and they may be printed in the same direction or in different directions.

In at least one such embodiment, both sides of the identification card may include printing (e.g., a bar code of one format on one side and a bar code of another format on another side). Moreover, it may be preferable to print a portion of at least one bar code over top of the photo to make it more difficult to alter the photo on the card with a new photo. Additional anti-counterfeiting measures may also be placed into the identification cards, such as holograms, watermarks, etc.

While the above has been described primarily in terms of obtaining images from a database, it should be appreciated that images may instead be obtained from multiple databases, either local or remote. Also, the images may simply be stored as separate files referenced by region type and index. For example, "\mouth\0007.jpg" and "\nose\0017.jpg" may correspond to the images of FIGS. 7A and 7B and could be stored on a local file system or a remote server, such as a web server whose name is prepended to the beginning of the filename.

The number of files in the "database" may vary according to the closeness of the match that is needed for the application. In some cases a high degree of matching may be obtained using a small number of images for each region, and in other applications a larger number may be needed. In order to facilitate matching, category-specific images may also be used if that improves matching. For example, a database for Caucasians versus Hispanics or Asians may improve matching using a small number of bits.

FIG. 9 shows an implementation of the present invention on a handheld scanning device such as a PDA equipped with a bar code scanner. In FIG. 9, the verifier (e.g., security guard or ticket agent) scans the bar code imprinted on the ticket. From the series of parameters read from the bar code (or retrieved using a read customer identifier), the scanner is able to regenerate the image of the intended customer. In the case of a bar code that also encodes other information, the scanner is able to verify the name (or other information) on the ticket at the same time. As would be appreciated by one of ordinary skill in the art, the handheld scanner can be any available handheld scanner that has been modified to read (and potentially decrypt) a bar code. (or other information carrier) into the series of parameters or identifier used to generate a composite image. Such a handheld scanner may further include a communications adapter (e.g., a wired or wireless communications adapter as described herein) for communicating with a remote computer (e.g., to convert a read customer identifier into a series of parameters).

The composite images of the present invention can also be utilized as part of a "police sketch artist" application. In this configuration, a user would select from or scroll through the images of the various regions trying to recreate a likeness of a person that he/she has seen. When the user is satisfied that the resulting composite image is sufficiently close to the person that they are trying to describe or identify, the system can then search a database for people with the series of parameters that encode that image (or at least a series of parameters that have a high number of parameters in common with the "sketched" person).

Utilizing a database of facial regions, such as the database described above, it is possible to create images for other reasons that identification. For example, it would be possible to create characters for games where the characters are specified by reference to the various facial regions of the database. Thus, players could have greater control over the look and feel of characters in games.

Similarly, in any other environment where a computer generates a likeness of a person (e.g., the famous computer-generated "talking heads" like Max Headroom). Such characters (as could also be used for computer "avatars") could also be personalized to look like a desired person or character. It may even be desirable to include in the database mouth and eye regions in various positions for each of the indices such that the face can be animated.

Because the amount of information to generate a composite picture is so small, the present invention may also be incorporated into various communication devices, e.g., PDA, cell phones and caller-ID boxes. In each of those environments, the receipt of the series of parameters would enable the communicating device to display the picture of the incoming caller or of the intended receiver of the call. Thus, a user of the communication device could be reminded of what a person looks like while communicating with that person.

The series of parameters can also be transmitted in a number of text environments. One such environment is a text messaging environment, like SMS or Instant Messaging, such that the participants can send and receive the series of parameters so that other participants can see with whom they are interacting. In the case of e-mail, the series of parameters could be sent as a VCard, as part of an email address itself, or as part of a known field in a MIME message.

The series of parameters can likewise be embedded into other communication mechanisms, such as business cards. Using watermarks or the like, a business card or letter could be encoded with the series of parameters such that a recipient could be reminded (or informed) of what a person looks like. Moreover, on letterhead, a several series of parameters could be encoded to convey the composite pictures of the principals of the company.

The functions described herein can be implemented on special purposes devices, such as handheld scanners and electronic checkout registers, but they may also be implemented on a general purpose computer (e.g., having a processor (CPU and/or DSP), memory, an information carrier reader, and long-term storage such as disk drives, tape drives and optical storage). When implemented at least partially in computer code, a computer program product includes a computer readable storage medium with instructions embedded therein that enable a computer to perform the functions described herein. However, the functions can also be implemented in hardware (e.g., in an FPGA or ASIC) or in a combination of hardware and software.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect or import of the methods described.

The invention claimed is:

1. A system for producing a personalized good, the system comprising:

an image repository including plural images for each of plural regions of faces of people;

an information receiver for receiving, for each of a plurality of said regions, information indicative of which images of said plural images should be grouped to form a composite image of an intended user of said personalized good; and at least one of a printer and an embedder for forming said personalized good by at least one of printing and embedding (1) said information indicative of which images of said plural images should be grouped to form the composite image and (2) the composite image of the intended user of said personalized good in said personalized good, wherein said information indicative of which images of said plural images should be grouped to form the composite image comprises a series of parameters that is specific to the day that the personalized good is intended to be used.

2. The system as claimed in claim 1, wherein the printer comprises a bar code printer.

3. The system as claimed in claim 1, wherein the printer comprises a watermark printer.

4. The system as claimed in claim 1, wherein the embedder comprises an RFID writer.

5. The system as claimed in claim 1, wherein the information receiver comprises a network adapter.

6. The system as claimed in claim 5, wherein the network adapter comprises a wired network adapter.

7. The system as claimed in claim 5, wherein the wired network adapter comprises an Ethernet adapter.

8. The system as claimed in claim 5, wherein the network adapter comprises a wireless network adapter.

9. The system as claimed in claim 8, wherein the wireless network adapter comprises an 802.11 adapter.

10. The system as claimed in claim 8, wherein the wireless network adapter comprises a Bluetooth adapter.

11. The system as claimed in claim 1, wherein the information repository comprises a database.

12. The system as claimed in claim 1, wherein the information repository comprises a file server.

13. The system as claimed in claim 1, wherein the information repository comprises a remote file server.

14. The system as claimed in claim 1, wherein the information indicative of which images of said plural images should be grouped comprises a plurality of indices, each index indicating, for a corresponding region of said plural regions, which image corresponds to the face of the intended user of said personalized good.

15. The system as claimed in claim 1, wherein the information indicative of which images of said plural images should be grouped comprises an identifier identifying a plurality of indices, each index indicating, for a corresponding region of said plural regions, which image corresponds to the face of the intended user of said personalized good.

16. The system as claimed in claim 1, wherein the plural images of the image repository comprise black-and-white images.

17. The system as claimed in claim 1, wherein the plural images of the image repository comprise pre-processed black-and-white images.

18. The system as claimed in claim 1, wherein the plural images of the image repository comprise color images.

19. The system as claimed in claim 1, wherein the plural images of the image repository comprise pre-processed color images.

20. The system as claimed in claim 19, wherein the information receiver comprises an image comparator for comparing, for each of plural regions of the face of the intended user of said personalized good, the plural images in the image repository against corresponding regions of an image of the face of the intended user of said personalized good.

21. The system as claimed in claim 1, wherein the information indicative of which images of said plural images should be grouped comprises sufficiently few bytes so as to be included in a credit card transaction.

22. The system as claimed in claim 1, wherein the information indicative of which images of said plural images should be grouped comprises less than 30 bytes.

23. The system as claimed in claim 1, wherein the information indicative of which images of said plural images should be grouped comprises 25 bytes.

24. A system for enabling production of personalized goods, the system comprising:

an image repository including plural images for each of plural regions of faces of people;

a comparator for comparing regions of an image of a subject to corresponding images of the plural images for each of plural regions of a face for the subject and for determining which of the corresponding images are to be used to represent the face of the subject; and a communications adapter for sending to a generator of personalized goods (1) information indicative of which of the corresponding images are to be used as part of a composite image to represent the face of the subject and (2) the composite image representing the face of the subject, wherein said information indicative of which of the corresponding images are to be used as part of the composite image to represent the face of the subject comprises a series of parameters that is specific to the day that the personalized good is intended to be used.

25. The system as claimed in claim 24, wherein the image repository comprises at least 4 regions of a face.

26. The system as claimed in claim 24, wherein the comparator comprises a pre-processor for pre-processing the image of the subject prior to comparing the image of the subject with corresponding images of the plural images.

27. A scanning device for displaying a composite image of an intended user of a personalized good, the device comprising:

an image repository including plural images for each of plural regions of faces of people;

an information carrier reader for obtaining, for each of a plurality of said regions, information from an information carrier indicative of which images of said plural images should be grouped to form a composite image of the intended user of said personalized good, wherein said information indicative of which images of said plural images should be grouped to form the composite image of the intended user of said personalized good comprises a series of parameters that is specific to the day that the personalized good is intended to be used; and a display for displaying the composite image using the images of said plural images that should be grouped, wherein the composite image displayed on the display can be compared with an image printed on the personalized good.

28. The device as claimed in claim 27, wherein the information carrier reader comprises a bar code reader.

29. The device as claimed in claim 27, wherein the information carrier reader comprises:

a reader for reading an identifier from the information carrier; and a communications adapter for requesting from a remote source, and based on the read identifier, a series of parameters identifying which images of said plural images should be grouped to form the composite image, wherein said series of parameters is specific to the day that the personalized good is intended to be used.

30. A method for producing a personalized good, the computer-implemented method comprising:

storing, in an image repository of a computer having a processor and memory, plural images for each of plural regions of faces of people;

receiving in the computer, for each of a plurality of said regions, information indicative of which images of said plural images should be grouped to form a composite image of an intended user of said personalized good, wherein said information indicative of which images of said plural images should be grouped to form the composite image of the intended user of said personalized good comprises a series of parameters that is specific to the day that the personalized good is intended to be used; and at least one of printing and embedding said information and the composite image into said personalized good using the computer.

* * * * *